US007756044B2

(12) United States Patent
Padhye et al.

(10) Patent No.: US 7,756,044 B2
(45) Date of Patent: Jul. 13, 2010

(54) INVERSE MULTIPLEXING HETEROGENEOUS WIRELESS LINKS FOR HIGH-PERFORMANCE VEHICULAR CONNECTIVITY

(75) Inventors: Jitendra D. Padhye, Redmond, WA (US); Ratul Mahajan, Seattle, WA (US); Sharad Agarwal, Seattle, WA (US); Brian Don Zill, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 71 days.

(21) Appl. No.: 12/183,848

(22) Filed: Jul. 31, 2008

(65) Prior Publication Data

US 2010/0027419 A1 Feb. 4, 2010

(51) Int. Cl.
*H04B 7/00* (2006.01)
*H04J 1/16* (2006.01)

(52) U.S. Cl. .................................. 370/238; 370/310
(58) Field of Classification Search ................. 370/235, 370/238, 248, 252, 254, 328, 329, 412, 508, 370/310
See application file for complete search history.

(56) References Cited

U.S. PATENT DOCUMENTS

| 6,373,831 | B1 | 4/2002 | Secord et al. |
| 6,819,658 | B1 | 11/2004 | Agarwal et al. |
| 7,139,281 | B1* | 11/2006 | Bodin ........................ 370/412 |
| 7,466,655 | B1* | 12/2008 | Zhao .......................... 370/238 |
| 2003/0099255 | A1 | 5/2003 | Kekki et al. |
| 2004/0184433 | A1 | 9/2004 | Reim et al. |
| 2004/0196798 | A1 | 10/2004 | Abousleman |
| 2007/0223400 | A1 | 9/2007 | Laarhuis et al. |
| 2008/0052605 | A1* | 2/2008 | Luo et al. .................... 714/776 |
| 2008/0259813 | A1* | 10/2008 | Matta et al. .................. 370/252 |
| 2009/0137254 | A1* | 5/2009 | Vukovic et al. ........... 455/452.1 |
| 2009/0170512 | A1* | 7/2009 | Regnier et al. ........... 455/435.1 |
| 2009/0245243 | A1* | 10/2009 | Rangarajan et al. ......... 370/389 |
| 2009/0323904 | A1* | 12/2009 | Shapiro et al. ................ 379/39 |

OTHER PUBLICATIONS

Funk et al., "Inverse Multiplexing in Short-Range Multi-Transport Wireless Communications", Mar. 2003, IEEE 2003 Wireless Communications and Networking, vol. 2, 6 pages.

Kim et al., "Improving TCP Performance over Wireless Networks with Collaborative Multi-Homed Mobile Hosts", USENIX 3rd Intl Conf on Mobile Systems, Applications and Services, May 2005, 14 pages.

(Continued)

*Primary Examiner*—Brian D Nguyen
(74) *Attorney, Agent, or Firm*—Lee & Hayes, PLLC

(57) ABSTRACT

Systems and methods are provided that enable high-performance Internet access on board moving vehicles. In an illustrative implementation, an exemplary wireless data communications environment comprises a PluriBus module, an instruction set comprising at least one instruction set to process data for wireless communication between a cooperating component onboard a moving vehicle and other cooperating wireless components, and one or more multiple wide-area wireless communications links. In an illustrative operation, the PluriBus module can perform one more wireless communications techniques comprising opportunistic erasure coding such that coded packets can be sent in the event that there are openings in the one or more wireless communication links' capacity and transmitting the data packets along the one or more wireless communications links that is estimated (e.g., in real time) to offer efficient delivery of data packets.

18 Claims, 10 Drawing Sheets

OTHER PUBLICATIONS

Kim et al, "PRISM: Improving the Performance of Inverse-Multiplexed TCP in Wireless Networks", IEEE Transactions on Mobile Computing, Dec. 2007, vol. 6, No. 12, 16 pages.

Li et al, "On the Performance of Traffic Equalizers on Heterogeneous Communication Links", ACM Intl Conf Proceeding Series, vol. 191, Proc 3rd Intl Conf on Quality of Service in Heterogeneous Wired/Wireless Networks, Aug. 2006, 8 pages.

Magalhaes et al., "End-to-End Multiplexing for Mobile Hosts", Journal of the Brazilian Computer Society, vol. 7, 2001, 11 pages.

Qureshi et al., "Building a High-Quality Mobile Telemedicine System using Network Striping over Dissimilar Wireless Wide Area Networks", 27th Annual Intl Conf of IEEE Engineering in Medicine and Biology Society, Sep. 2005, 4 pages.

* cited by examiner

INVERSE MULTIPLEXING HETEROGENEOUS WIRELESS LINKS FOR HIGH-PERFORMANCE VEHICULAR CONNECTIVITY

BACKGROUND

Internet access on-board buses, trains, and ferries is becoming increasingly common. As a measure of the need for mobile vehicular Internet access, public transportation agencies in over twenty cities in the USA currently provide such access to boost ridership and many more are planning to incorporate such services. Corporations also provide such access on the commute vehicles for their employees. For instance, in the San Francisco area in the United States, more than one-quarter of a large technology company's work force uses such Internet connected buses. By all accounts, riders greatly value this connectivity. It enables them to browse the Web, exchange email, and work on the way to their destinations.

Despite their increasing popularity, current practices are insufficient and the networks are not optimally engineered. Most current systems use only one wireless uplink for communication. But his provides poor performance because wireless links in vehicular environments tend to be lossy and have highly variable delay. Some systems operate to bond multiple links or paths into a single higher-performance communication channel. These systems stripe data between end hosts across arbitrary paths by using TCP or a protocol inspired by it along each path. This provides automatic loss recovery. These mechanisms work well in an end-to-end setting but not in an in-network proxy setup because loss recovery in them is based on end-to-end feedback. If applied to an in-network proxy system, such an approach would be less than acceptable in hiding losses from users' TCP because of the high delay of paths between two cooperating proxies.

Other current practices, combine multiple wide-area wireless links to improve Internet connectivity on vehicles. For example MAR uses a simple connection-level striping policy but leaves open the task of building more sophisticated algorithms. Comparatively, Horde specifies a QoS API and stripes data as per policy. It requires that applications be rewritten to use the API which is limiting and arduous. Also, current practices such as MAR and Horde do not focus on loss recovery as a key variable to be addressed when wirelessly communicating data.

Delay-based path selection across wireless links is addressed by current practices. However, current solutions are lacking since it does not consider the impact of loss. Several current solutions focus on the case where the wired links behind the base-stations are the bottlenecks and focus on aggregating their bandwidths. Further, prior work includes studies of TCP's performance over wireless links. Both network-level and host-level improvements have been proposed.

Currently deployed erasure codes and other forward error correction (FEC) techniques guard against packet losses. Such techniques, however, do not focus on partial recovery. Systems such as MORE and COPE use network coding in multi-hop wireless mesh networks. These systems exploit the broadcast nature of wireless medium and code across multiple nodes and tend to contribute to signal/data loss.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein provides for systems and methods that enable high-performance Internet access on board moving vehicles. In an illustrative implementation, an exemplary wireless data communications environment comprises a PluriBus module, an instruction set comprising at least one instruction to process data for wireless communication between a cooperating component onboard a moving vehicle and other cooperating wireless components, and one or more multiple wide-area wireless communications links.

In an illustrative operation, the PluriBus module can perform wireless communications techniques comprising opportunistic erasure coding such that coded packets can be sent in the event that there are openings in the one or more wireless communication links' capacity and transmitting the data packets along the one or more wireless communications links that is estimated (e.g., in real time) to offer efficient delivery of data packets. In the illustrative implementation, the PluriBus module can deploy one or more evolution codes to communicate data across the one or more wireless communications links.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
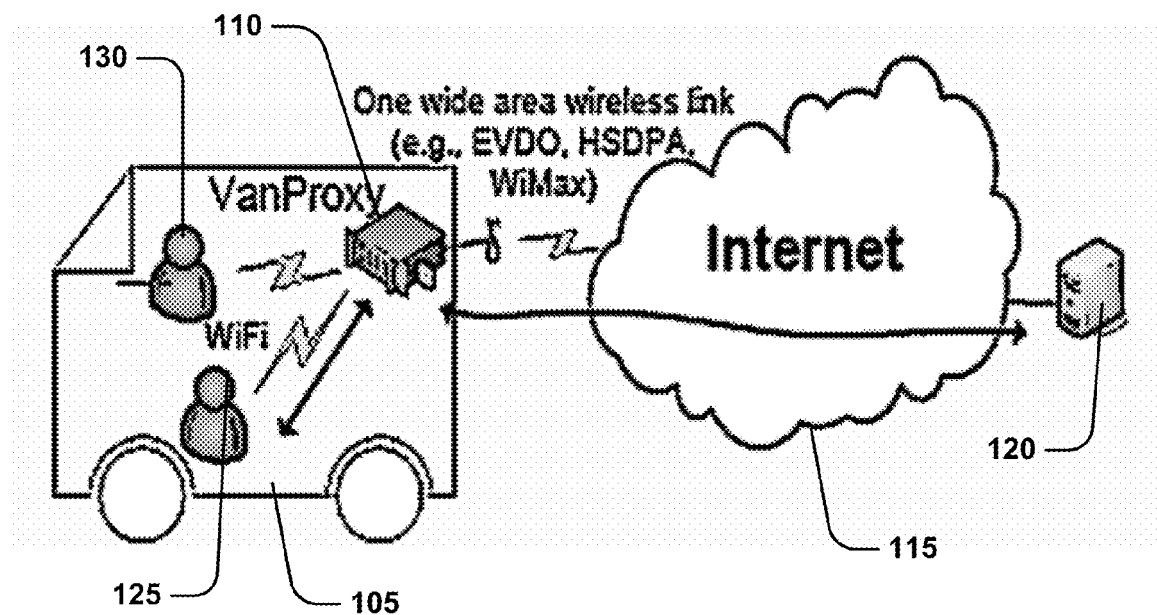
FIG. 1 is a block diagram of one example of an illustrative wireless communications environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Pluribus and Evolution Codes Overview:

The herein described systems and methods comprise a PluriBus, that enables high-performance Internet access on-board moving vehicles. In an illustrative implementation, the vehicles can be equipped with multiple wide-area wireless links that are bonded by the PluriBus according to the execution of two exemplary techniques. In the illustrative implementation, the first technique includes protecting against losses without interfering with data traffic by deploying one or more evolution codes (e.g., a novel opportunistic erasure coding technique). In the illustrative implementation, coded packets can be sent when there are instantaneous openings in a wireless communications links' spare capacity. Packets can be coded using exemplary evolution codes that we have developed to maximize the expected number of packets recovered with each coded packet. In the illustrative implementation, a second technique can operatively allow PluriBus to transmit data packets along the wireless communications link that is identified to maintain the minimum delay path (i.e., relative to other communications links).

In the illustrative implementation, PluriBus is operative to deploy an opportunistic erasure coding (e.g., evolution codes) technique that illustratively masks losses from applications. Instantaneous openings in the bottleneck wireless communications links' available bandwidth can be exploited to send erasure coded packets. The openings can be judged using an estimate of queue length and capacity at the bottleneck wireless communications link. In the illustrative implementation, coded packets can operate to tax bandwidth from future data packets.

Illustratively, packets can be coded using exemplary evolution codes that operate to maximize the expected number of packets recovered with each coded packet. Opportunistic erasure coding can provide efficiencies over retransmitting lost packets based on feedback from the other proxy because path delays tend to be high. Additionally, opportunistic erasure can also provide efficiencies over existing erasure coding methods such as Reed-Solomon or LT codes.

In an illustrative implementation, an evolution code can be considered an erasure coding method/process operative to determine the contents of each coded packet transmitted by the exemplary PluriBus. In an illustrative operation, since, a priori, it is not determined how many additional coded packets can be sent across an exemplary communications link, each coded packet can maximize the expected number of packets that will be recovered. Stated differently, partial recovery rather than optimize the number of packets needed for full recovery is performed.

For example, with an exemplary evolution code, at any given instant, the sender can operatively code a set of data packets W that were sent within the previous round trip time. In the exemplary, the sender also can operatively estimate the fraction r of the W packets (but not which exact packets) that has been successfully recovered by the receiver, based on past transmissions of data and coded packets. For tractability, each packet in W can maintain the same probability, equal to r, of being present at the receiver. In practice, the probabilities of different packets may differ based on the contents of earlier packets and the paths over which they were sent. In an illustrative operation, coded packets by XOR-ing data packets together can be created. Given, in the example, that all packets have the same probability of being there at the receiver, a selected number packets can be XOR'd. The selected number can be based on an operational property that coded packets that could not be immediately decoded at the receiver are discarded, and thus a coded packet can recover at most one data packet.

For example, suppose the sender XORs $x$ ($1 \leq x \leq |W|$) data packets in W. The probability that this coded packet will yield a previously missing data packet at the receiver is equal to the probability that exactly one out of the x packets is lost. That is, the expected yield Y (x) of this packet is:

$$Y(x) = x \times (1-r) \times r^{x-1}$$

$$Y(x) \text{ is maximized for } x = \frac{-1}{\ln(r)}$$

If the expected number of data packets at the receiver (r) is low, the coded packet should contain few data packets. For instance, if more than half of the packet are missing, only one packet at a time (i.e. essentially re-send one of the packets in W) can be performed; coding even two does not result in an efficiency since of both packets being absent, and hence of nothing being recovered, is high. Conversely, if more packets are already there at the receiver, encoding a higher number of packets can recover missing data.

Thus, in PluriBus, the sender selects $$\max\left(1, \left\lfloor \frac{-1}{\ln(r)} \right\rfloor\right)$$

data packets at random to XOR. Illustratively, the number of packets is round down because including fewer data packets provides desired results. Furthermore, if |W|>1 and ⌊−1/ln(r)⌋≧|W|, XOR only |W|−1 packets. The entire window of packets is not XOR'd because of a subtle corner case that arises if the window of packets is not changing and more than one data packet is missing at the receiver but the sender estimates that fewer data packets are missing. In the example provided, the direct application of the evolution code could result in the repeated transmission of the same deterministic coded packet at each opportunity. This packet, however, would be unable to recover any more packets at the receiver.

In the illustrative implementation, W and r can be updated according to the following illustrative process. The sender updates the set of packets W and estimated fraction r as follows.

i) When a new data packet is sent, it is first added to W, and then:

$$r = \frac{(|W|-1) \times r + (1-p)}{|W|}$$

where p is an estimate of the loss rate of the path along which the packet is sent. Receivers can operatively estimate p using an exponential averaging of past behavior and periodically inform the sender of the current estimate.

ii) When a coded packet, formed by XOR'ing x data packets, is sent, W does not change, and $$r = \frac{|W| \times r + (1-p) \times Y(x)}{|W|}$$

where Y (x) is defined above.

iii) When the receiver returns the highest sequence number that it has received—this information is embedded in packets flowing in the other direction—packets with lower or equal sequence numbers can be removed from W, and r is unchanged. This step ensures that the sender encodes only over roughly one round trip of data.

In the illustrative implementation, the second technique can be deployed to stripe data across one or more communications paths offered by the various wireless communications links based on an estimated delivery delay along the one or more communications paths. In the illustrative implementation, delivery delay can be estimated by estimating communication path capacity, wireless communications links queue length, and wireless communications links propagation delay. The striping decision for each packet can be taken independently. In the illustrative implementation, PluriBus can operate to select a more robust communications path until the queues on the robust path (e.g., a faster communications path) obtain a selected delay to illustratively match the non-robust communications path (e.g., a slower communications path).

Wireless Communication Channel Improvement:

FIG. 1 shows an exemplary wireless communications environment 100 for use to enable Internet access on vehicles. As is shown in FIG. 1, wireless communications environment 100 comprises vehicle 105, the Internet 115, and data server 120. Further, as is shown in FIG. 1, vehicle 105 can comprise users 125, 130 and Van Proxy 110. In an illustrative operation, users 125 and 130 can connect via a wireless fidelity connection (e.g., 802.11x) to the Internet 115 using the Van Proxy 110 wireless communications link to obtain desired data from data server 120. In an illustrative implementation, the wireless communications link can be implemented using an exemplary wide-area wireless technology such as EVDO or HSDPA.

Figure 2:
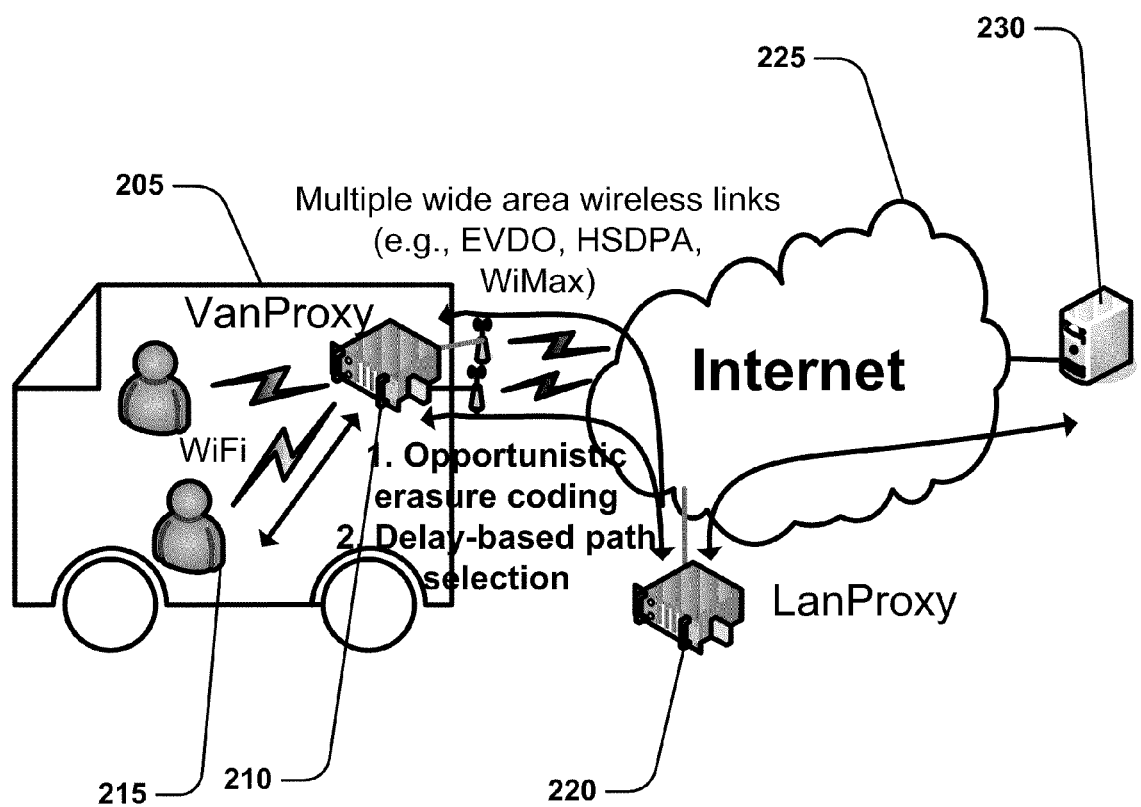
FIG. 2 is a block diagram of one example of an illustrative wireless communications environment in accordance with the herein described systems and methods.

FIG. 2 shows an exemplary wireless communications environment 200 for use to enable Internet access on vehicles. As is shown in FIG. 2, exemplary wireless communications environment 200 comprises vehicle 205, the Internet 225, LAN Proxy 220, and data server 230. Further, as is shown in FIG. 2, the vehicle 205 comprises users 215 and Van Proxy 210. In an illustrative operation, users 215 can connect via WI-FI mechanism to Van Proxy 210, that in turn cooperates with LAN Proxy 220 to allow wireless connectivity to the Internet 225 and to allow users 215 to obtain desired data from data server 230. In an illustrative implementation, two or more wide-area wireless communications links can be utilized and that can cooperate with Van Proxy and LAN Proxy to affect wireless communications. In the illustrative implementation, an exemplary PluriBus (not shown) can be deployed to bond such illustrative two or more wide-area wireless communications links through additional cooperation with LAN Proxy 220.

With reference to FIGS. 1-2, the herein described systems and methods provide one or more paths between the Van Proxy and LAN Proxy. In an illustrative implementation, exemplary communication paths used to communicate data comprise various properties including but not limited to that the communication path can be based on a different wide-area wireless communications link, the communication path can be lossy with a time-varying loss rate, and the communication path can maintain a fixed or slowly-varying transmission capacity. In the illustrative implementation, different communication paths can maintain different capacities and delays. In an illustrative operation, incoming data can be bursty and can arrive at an unknown and time-varying rate.

In an illustrative implementation, path losses can be mitigated from end users by retransmitting lost packets from the sending proxy based on feedback from the other one or more cooperating proxies. In the illustrative implementation, paths between the two cooperating proxies have a high round-trip-time (RTT) and this RTT can be major component of the end-to-end RTT. In the illustrative implementation, recovery can be performed on packets sent within the last RTT and the recovery packets can be sent as after the original packets, without waiting for feedback from the other proxy. Proactive erasure coding techniques can be deployed to deploy such loss mitigation techniques. However, existing erasure coding techniques either add a fixed amount of overhead in terms of transmitted packets or assume that at least a threshold number of coded packets will be received. Bursty traffic and highly variable loss rates can imply that there may not be enough additional capacity at short times scales over which erasure coding must be done.

In an illustrative implementation, an exemplary PluriBus can deploy opportunistic erasure coding to overcome shortcomings of existing practices. In the illustrative implementation, coded packets can be sent opportunistically, that is, in the event that there is spare capacity in the system (e.g., instantaneous spare capacity). Thus, coded packets can defer to new data packets. Additionally, in the illustrative implementation, an exemplary PluriBus can be operative to send each data packet along a communications path that is calculated by an exemplary PluriBus module (not shown) to deliver it first (e.g., identifying minimum path delay).

It is appreciated that, although, the mitigation techniques described herein are described to work in combination, that such description is merely illustrative since they can be independently used as well. For example, opportunistic erasure coding can boost reliability even when there is only one wide-area wireless link. Similarly, delay-based path selection can bond multiple paths such that the delay of the combined channel is low even when erasure coding is not used to boost reliability.

In the illustrative implementation, opportunistic erasure coding considers the transmission of coded packet such that little or no delay is added to new data packets. Second, the coding scheme itself illustratively is flexible in that coding scheme is independent of the fixed number coded packets per data packet or of a threshold number of packets reaching the receiver. In the illustrative implementation, PluriBus operatively estimates the queue length at the bottleneck link of the communication paths and transmits a coded packet along a communication path when that estimate reaches a selected threshold (e.g., a value of zero). In an illustrative operation, data packets can be transmitted along the communications path the identified (estimated) least delay as soon as they arrive at the sending proxy. It is appreciated that that the communications path with zero queue need not be the communications path with the least delay.

In the illustrative implementation, evolution codes can be deployed that can comprise an erasure coding method that determines the contents of each coded packet transmitted by an exemplary PluriBus. In the illustrative implementation, partial recovery of communicated packets can be executed as compared with optimizing the number of packets contributing to a full recovery. Illustratively, with evolution codes, at any given instant, a cooperating component (e.g., Van Proxy or LAN Proxy—as described in FIG. 3) can operatively send codes over a set of data packets W that were sent within the previous round trip time. Further, in the illustrative operation, a cooperating component can also estimate the fraction r of the W packets that has been successfully recovered by cooperating receiving component, based on past transmissions of data and coded packets.

In an illustrative operation, if the expected number of data packets at the receiver (r) is low, the coded packet should contain few data packets. For instance, if more than half of the packet are missing, only one packet can be coded at a time (i.e., re-send one of the packets in W); coding even two packets can render an inefficiency since the chance of both packet being absent, and hence of nothing being recovered, increases. Conversely, if more packets are already present at the receiver, encoding a higher number of packets can be performed to recover missing data. Illustratively, evolution codes have this property.

Illustratively, PluriBus can send newly arrived data packets along a communications path that is calculated to have a high probability to deliver the data packets first as compared to other communications paths. The delivery time of the path can be based on i) transmission time, which primarily depends on capacity of bottleneck link; ii) time spent in the queue; and iii) propagation delay. Illustratively, such quantities can be estimated based on the notion that the wide area wireless link is the bottleneck link along the end-to-end path.

Figure 3:
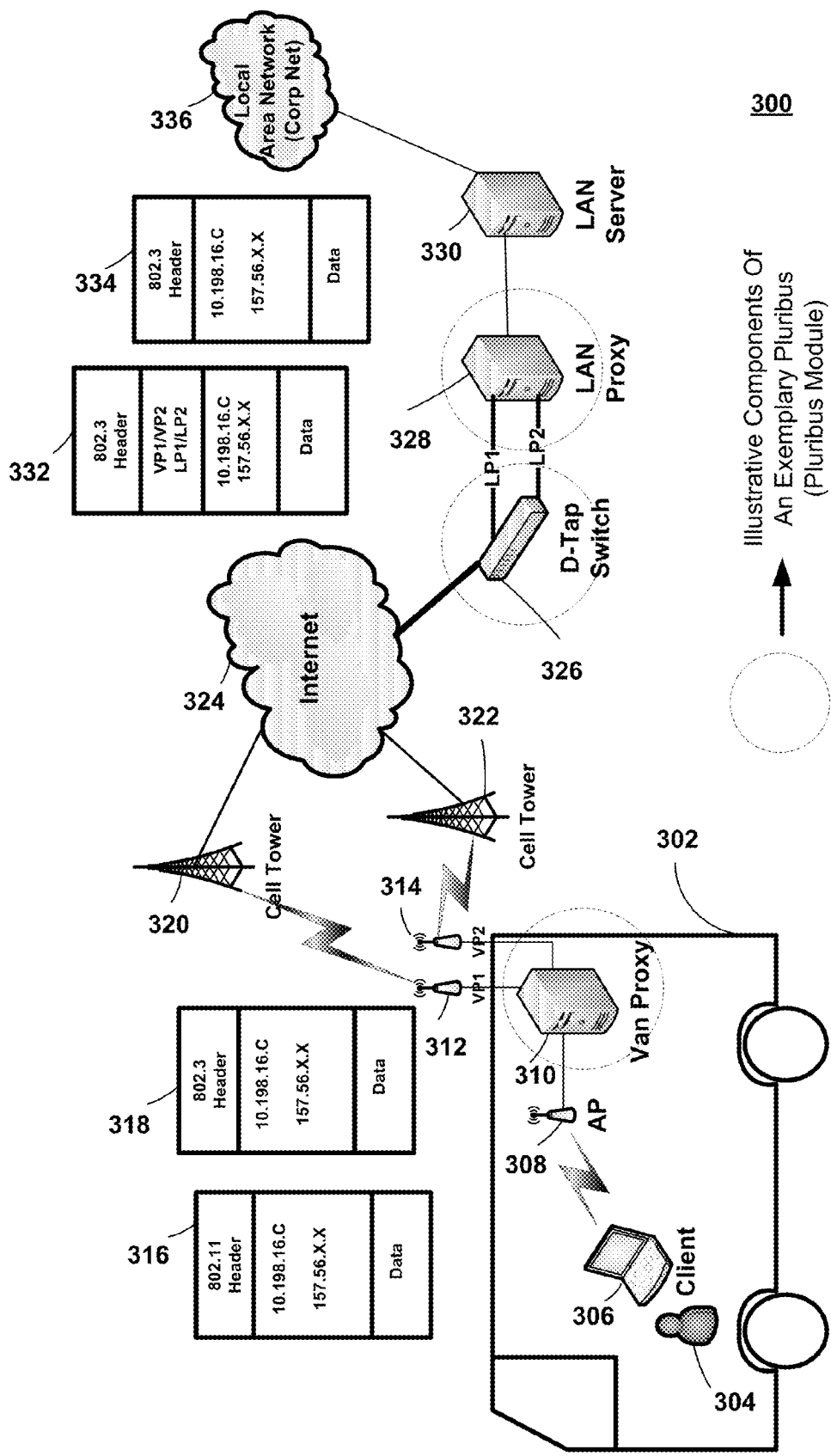
FIG. 3 is a block diagram of the interaction of exemplary components of an illustrative wireless communications environment in accordance with the herein described systems and methods.

FIG. 3 shows exemplary wireless communications environment 300. As is shown in FIG. 3, wireless communications environment 300 comprises vehicle 302, cell towers 320 and 322, the Internet 324, communications switch 326, LAN Proxy 328, LAN server 330, and local area network (e.g., corporate network) 336. Further, as is shown vehicle 320 comprises user 304, client computing environment 306, wireless access point (AP) 308, and antenna elements 312, and 314. Additionally, boxes 316, 318, 332, and 334 describe communication states at various points along the wireless communications environment such that communication state 316 describes communication parameters found at client computing environment 306, communication state 318 describes communication parameters found at Van Proxy 310, communication state 332 describes communication parameters at LAN Proxy 328, and communication state 334 describes communication parameters found at LAN server 330 for data packets being communicated between these cooperating components of exemplary wireless communications environment 300. Also, as demarcated by the dashed circles represent cooperating components contributing to the operation of an exemplary PluriBus module.

In an illustrative operation, a user can interface with client computing environment 306 to wireless transmit and/or receive data with cooperating access point 308. Such transmitted data can then be processed by Van Proxy 310 for communication to LAN Proxy 328 through one or more cell towers 320, 322 and the Internet 324. The transmitted data can then be communication from LAN Proxy 328 to LAN 336 via LAN server 330. Illustratively, client Van Proxy 310 can operate to receive data from LAN 336 through LAN Server 330 cooperating with LAN Proxy 328 and communications switch 326 operatively connected to the Internet 324 and through one or more cell towers 320, 322.

With reference to FIG. 3, an exemplary deployment of PluriBus can operatively utilize multiple sequence number spaces at each proxy (e.g., Van Proxy and LAN Proxy). Illustratively, one space can be used for data packets that arrive at the proxy to be sent to the other proxy; each data packet is assigned the next sequence number from this space. Illustratively, these data-level sequence numbers let the receiver uniquely identify data packets and their relative order. In addition, there is also a per-path sequence number space; each packet transmitted along a path is assigned the next sequence number from this space. Path-level sequence numbers help the receiver estimate various properties of the in-coming path, such as loss rate. The LAN Proxy maintains this set of spaces for each Van Proxy that it serves.

Each PluriBus proxy caches all data packets arriving from other proxies for a brief window of time so that coded packets can be decoded. They also have a sequencing buffer to order received data packets. When a data packet received from the other proxy has a sequence number that is higher than one plus the highest sequence number relayed, it is stored in this buffer. It leaves the buffer as soon as the missing data packets are received directly or recovered from coded packets. If the hole is not filled for a threshold amount of time, set to 50 ms in our experiments, the data packet is relayed immediately.

With reference to FIGS. 1-3, it is appreciated that although the various wireless communications environments are depicted having various configurations of components (e.g., Van Proxy is separate and apart from the client computing environment, LAN Proxy is separate and apart from the LAN Server) that such depiction is merely illustrative as the herein described systems and methods can be deployed in various component configurations including but not limited to having an integrated Van Proxy within the client computing environment, having an integrated access point within the client computing environment, having an integrated LAN Proxy with the LAN Server, and wherein the Wide-Area-Network link is a WI-FI communications link).

Figure 4:
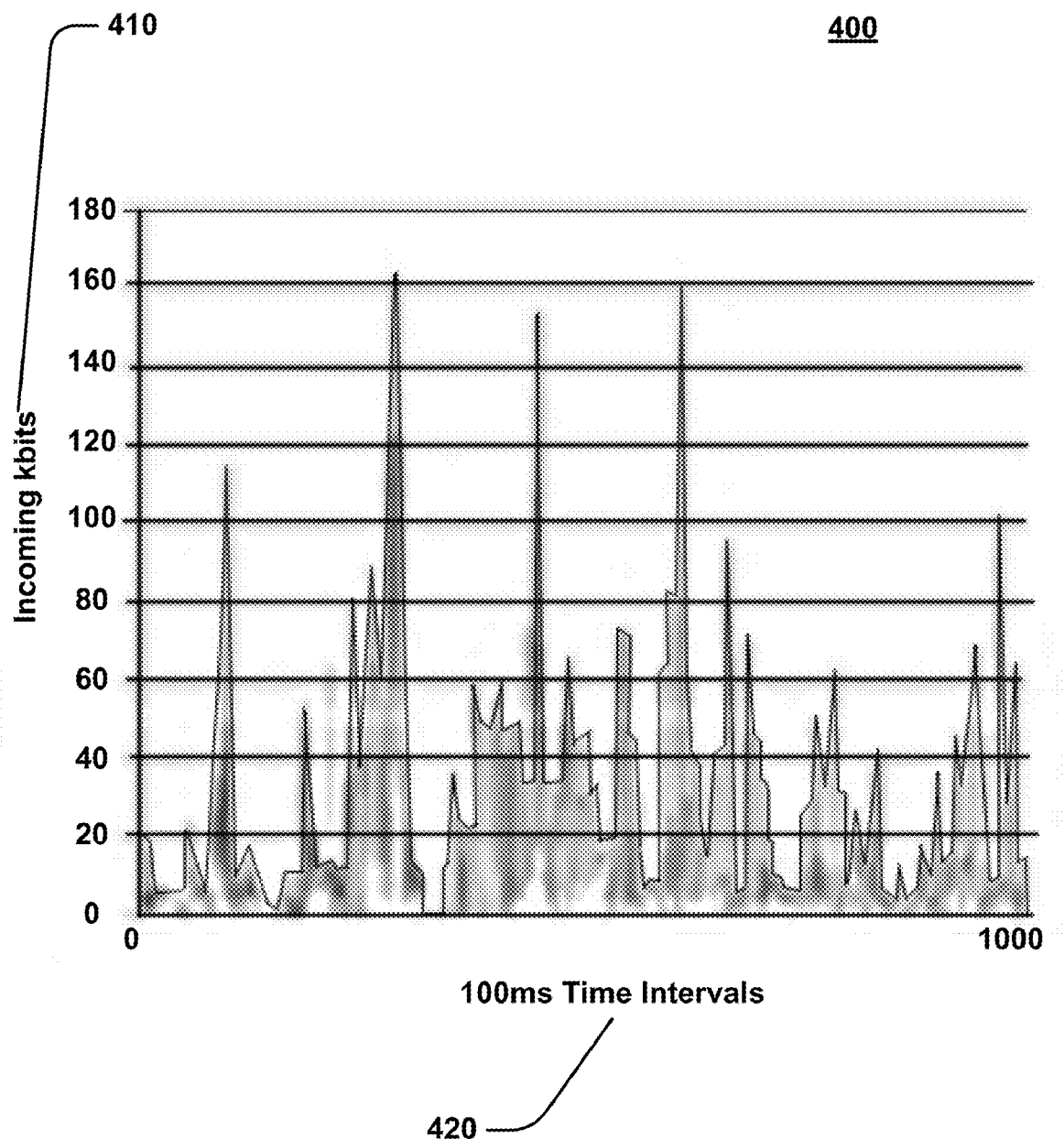
FIG. 4 is a block diagram of a chart describing the time intervals of data packets being communicated across one or more wireless communications links in accordance with the herein described systems and methods.

FIG. 4 shows a block diagram of a graph 400 representing the transmission rates of exemplary data packets across an exemplary wireless communications environment that employ conventional wireless communication techniques. As is shown in FIG. 4, graph 400 comprises data representative of received data packets 410 (as delineated by the number of received kilobits) over a selected time interval 420 (as delineated in 100 ms time intervals). Graph 400 suggests that the traffic can be dominated by short TCP flows, which can be vulnerable to packet loss and can be bursty. The burstiness of the traffic flow across the wireless communications link is indicated by the spikes at various selected intervals. Less bursty communications operations would be characterized by less spikes and more even data transmission flow.

Figure 5:
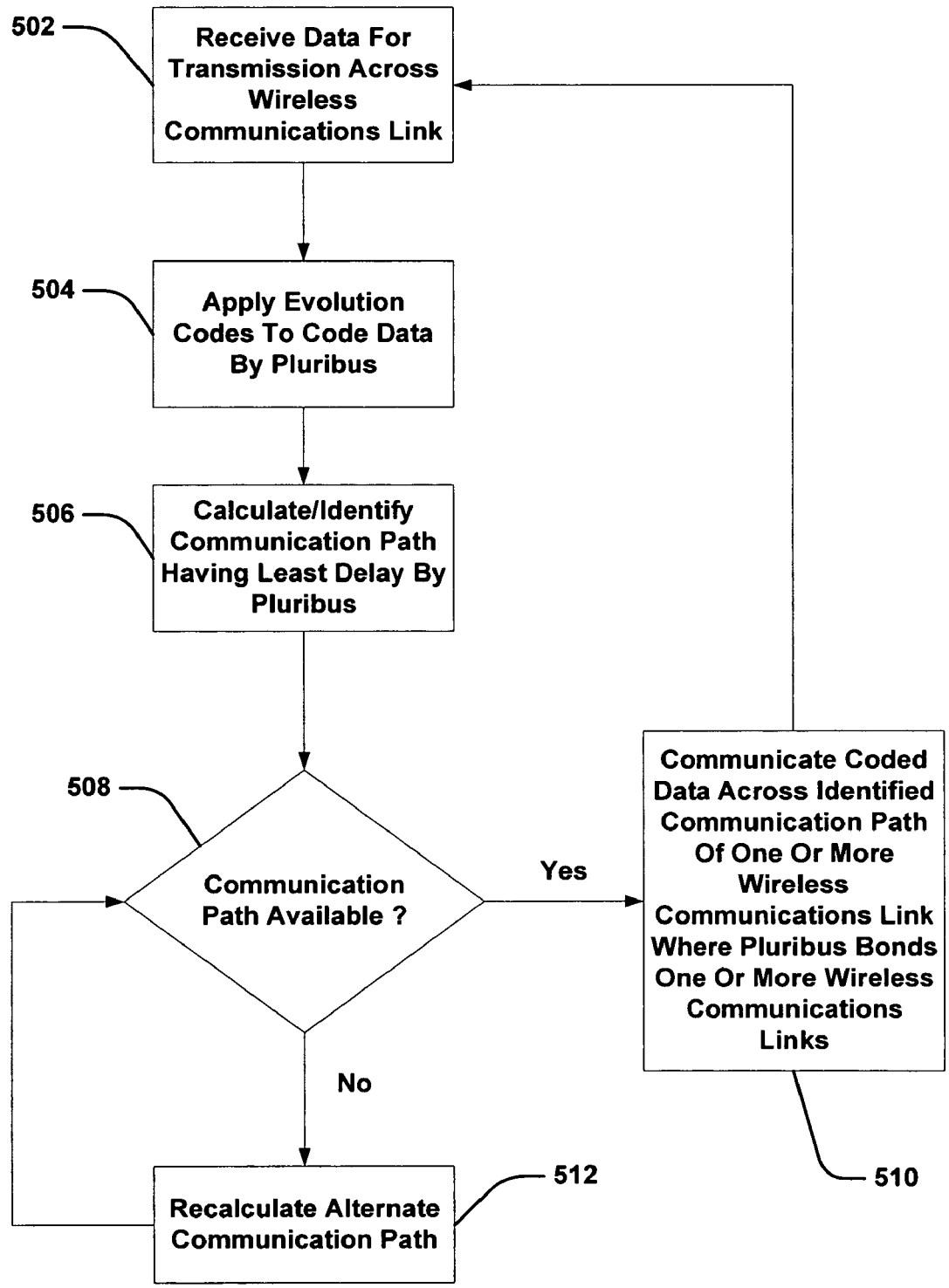
FIG. 5 is a flow diagram of an exemplary method for communicating data across one or more wireless communications links in accordance with the herein described systems and methods.

FIG. 5 is a flow diagram of one example of a method 500 performed to mitigate loss across a wireless communications environment. As is shown, processing begins at block 502 where data is received for transmission across one or more wireless communications links. Processing then proceeds to block 504 where one or more evolution codes are applied to the code received data by an exemplary PluriBus module. The communication path having the least delay is calculated/identified by the PluriBus at block 506. A check is then performed at block 508 to determine if the identified communication path is available.

If the check at block 508 indicates that the identified communication path is available, processing proceeds to block 510 where the coded data (e.g., coded according to the one or more evolution codes) is communicated across the identified communication path of the one or more cooperating wireless communications links at block 510. Processing then reverts to block 502 and proceeds from there. However, if the check at block 508 indicates that the identified communication path is no available, processing proceeds to block 512 where an exemplary PluriBus module recalculates an alternate communication path. Processing then proceeds back to block 508 and continues from there.

Figure 5A:
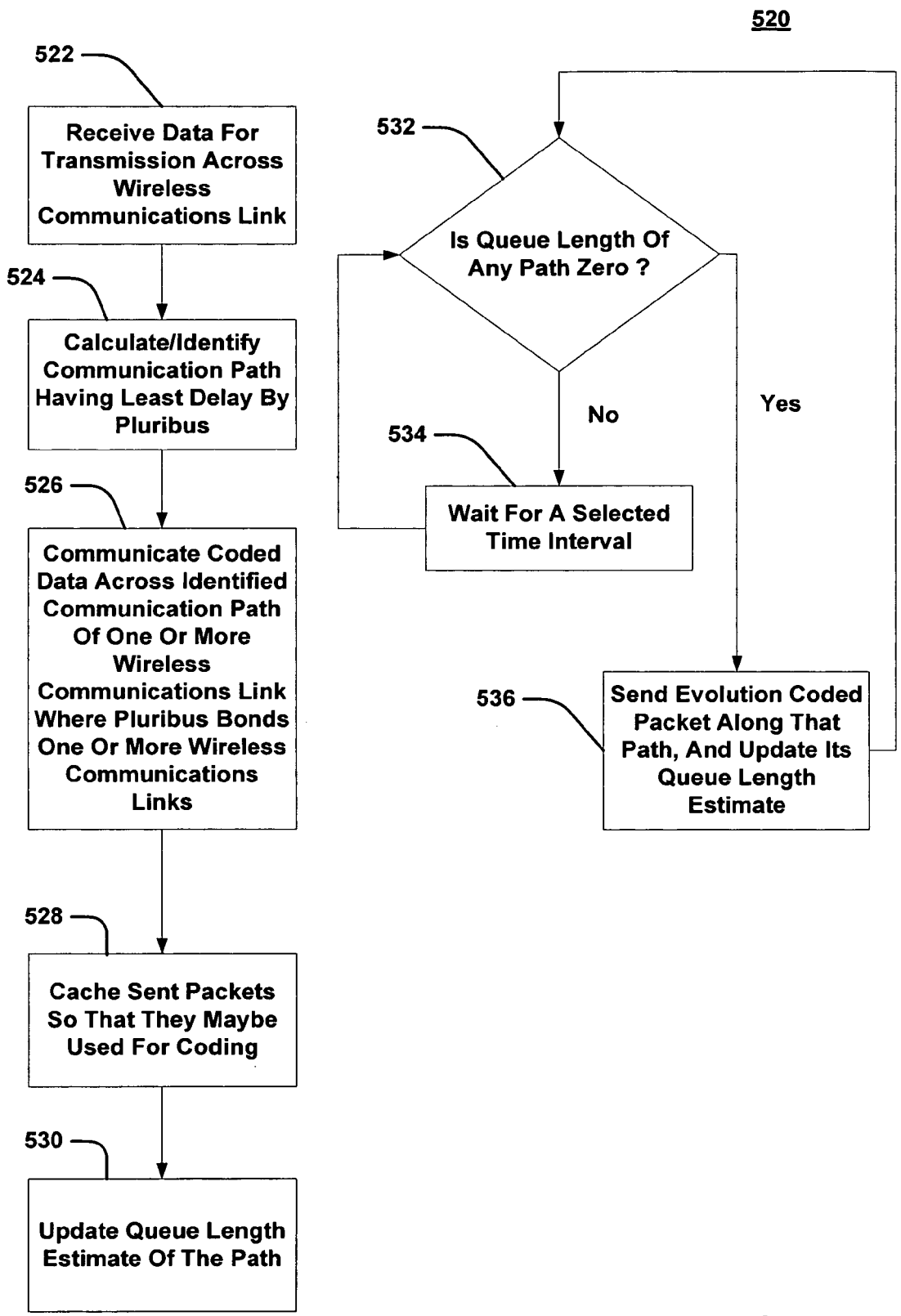
FIG. 5A is a flow diagram of an exemplary method for communicating data using complimentary processing threads in accordance with the herein described systems and methods.

FIG. 5A is a flow diagram of one example of a method 520 performed to communicate data using complimentary processing threads. As is shown in an exemplary first processing thread, processing begins at block 522 where data is received for transmission across a wireless communications link. Processing then proceeds to block 524 where a communication path is calculated/identified by an exemplary Pluribus having the least delay (i.e., among the available communications links). Processing then proceeds to block 526 where coded data is communicated across the identified communication path of the one or more wireless communications links where the Pluribus bonds one or more wireless communications links. Packets can then be sent to a cooperating cache for use in coding at block 528. The queue length estimate of the identified communications path is then updated at block 530.

Further, as is shown in FIG. 5A, a complimentary processing thread can be performed. As is shown, the second complimentary processing thread begins at block 532 where a check is performed to determine if the queue length of any path is zero. If the check at block 532 indicates that the queue length is zero, processing proceeds to block 536 where an evolution coded packet is sent along the identified communication path and the queue length estimate is also updated. Processing then reverts to block 532 and proceeds from there. However, if the processing at block 532 indicates that there isn't a queue length of any path equal to zero, processing proceeds to block 534 where the exemplary Pluribus waits for a selected time interval. Processing then reverts to block 532 and proceeds from there.

Figure 5B:
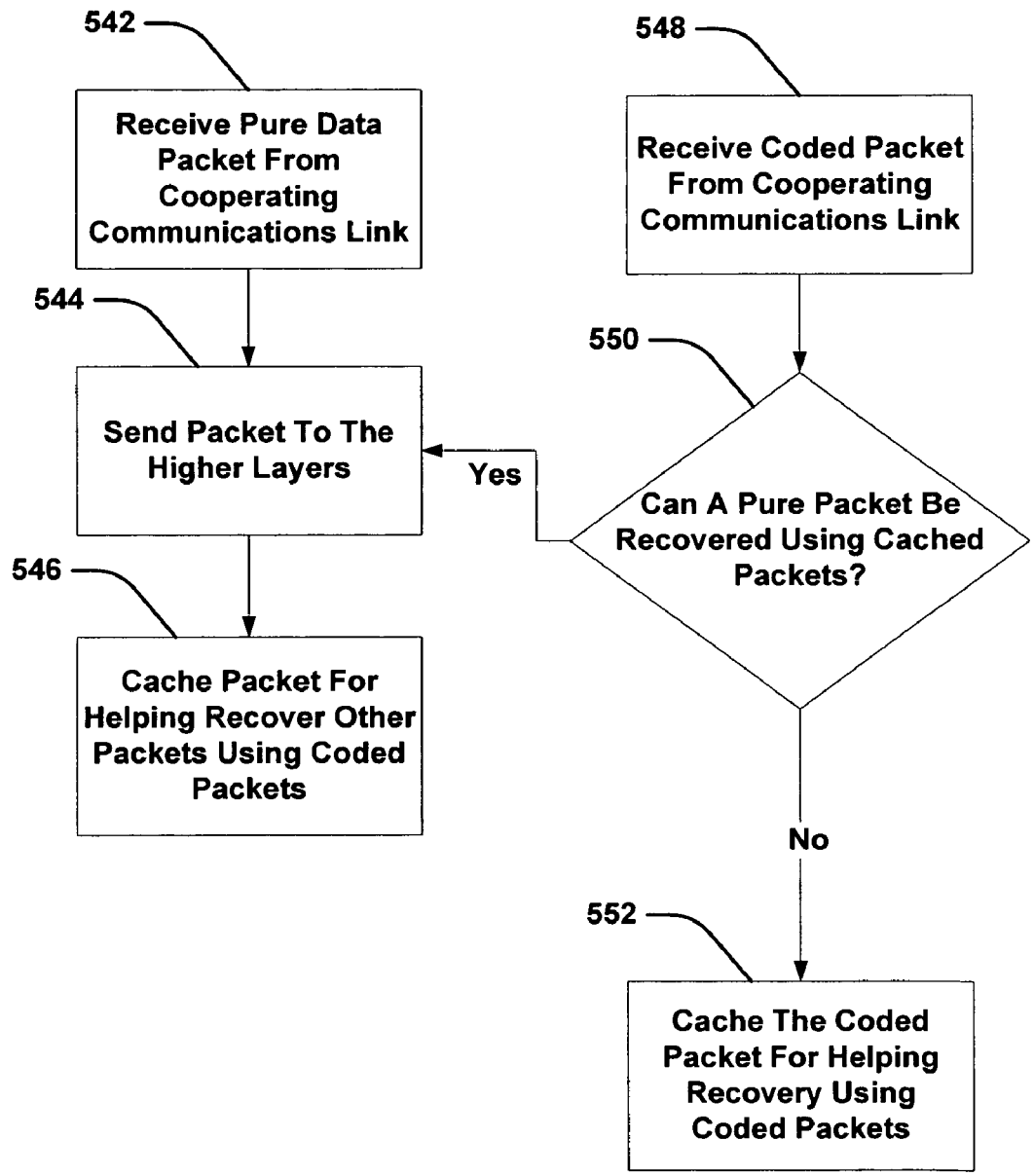
FIG. 5B is a flow diagram of an exemplary method for communicating data using other complimentary processing threads in accordance with the herein described systems and methods.

FIG. 5B is a flow diagram of one example of a method 540 performed to communicate data using complimentary processing threads. As is shown, processing on a first thread begins at block 542 where a pure (e.g., uncoded) data packet is received from a cooperating communications link. Processing then proceeds to block 544 where the packet is sent to higher layers for processing. The packet is then cached at block 546 and can be used for helping recover other packets using coded packets.

Further, as is shown, in FIG. 5B, a complimentary processing thread can be performed. As is shown in, processing begins at block 548 where a coded packet is received from a cooperating communications link. Processing then proceeds to block 550 where a check is performed to determine if a pure packet (e.g., uncoded packet) can b recovered using the cached packets. If the check at block 550 indicates that a pure packet can not be recovered, processing proceeds to block 552 where the coded packet is cached for use in assisting recovery operations using coded packets. However, if the check at block 550 indicates that a pure packet can be recovered using cached packets, processing jumps to block 544 and proceed s from there.

Figure 6:
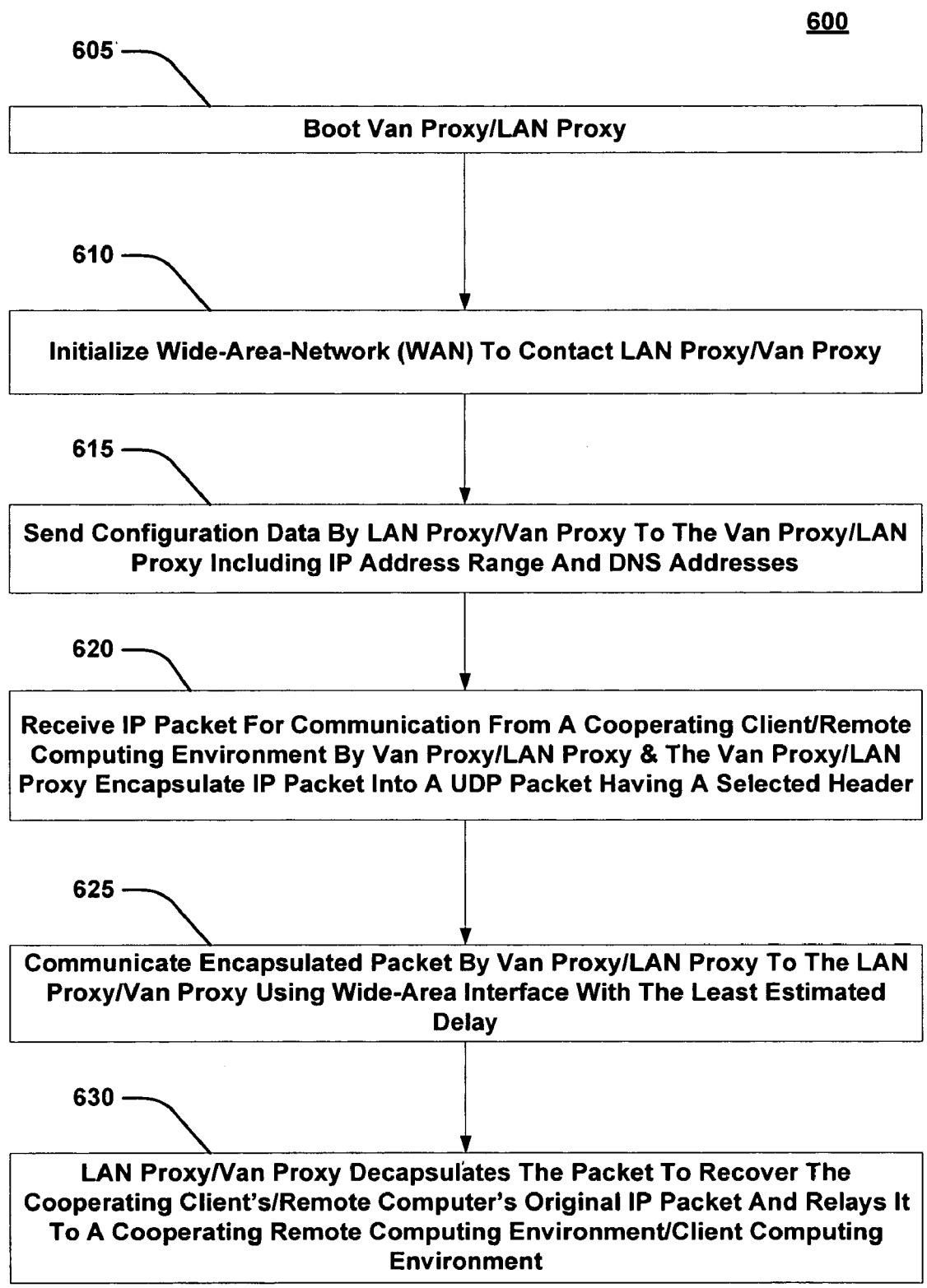
FIG. 6 is a flow diagram of an exemplary method for communicating data deploying opportunistic erasure coding and minimum path delay in accordance with the herein described systems and methods.

FIG. 6 is a flow diagram of one example of a method 600 performed to deploy and execute an exemplary PluriBus as part of a wireless communication environment. As is shown in FIG. 6, processing begins at block 605 where an exemplary Van Proxy and/or LAN Proxy are booted. Processing then proceeds to block 610 where a wide-area-network (WAN) is initialized to allow communication between an exemplary Van Proxy and a LAN Proxy. Confirmation data is then sent between the cooperating Van Proxy and LAN Proxy including Internet packet (IP) address range and domain name server (DNS) addresses. IP packets intended for communication across the wireless communications environment are then received from a cooperating client and/or remote computing environment by the Van Proxy and/or LAN Proxy respectively for encapsulation by the Van Proxy and/or LAN Proxy into a user datagram protocol (UDP) packet having a selected header. The encapsulated packet is then communicated by the Van Proxy/LAN Proxy to the LAN Proxy/Van Proxy, respectively, using a wide-area interface having the least estimated delay. At block 630, the LAN Proxy/Van Proxy decapsulates the received packet to recover the cooperating client's/remote computer's original IP packet and relays the original decapsulated IP packet to a cooperating remote computing environment/client computing environment, respectively.

It is appreciated that although exemplary method 600 is described to perform various acts between a Van Proxy and LAN Proxy that such description is merely illustrative as the systems and methods described herein allow for the performance of various acts between various cooperating components of a wireless communications environment not described by method 600.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
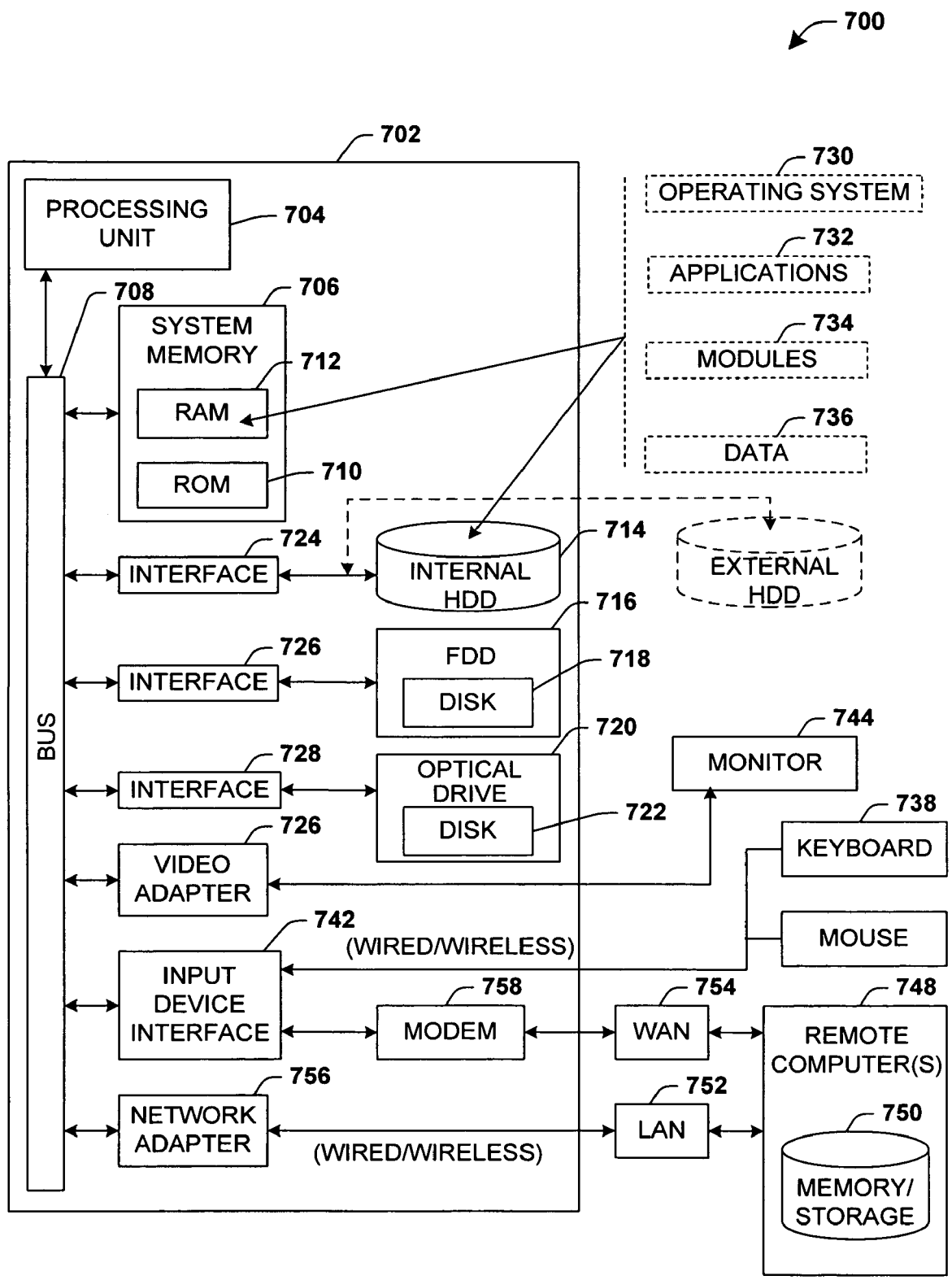
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
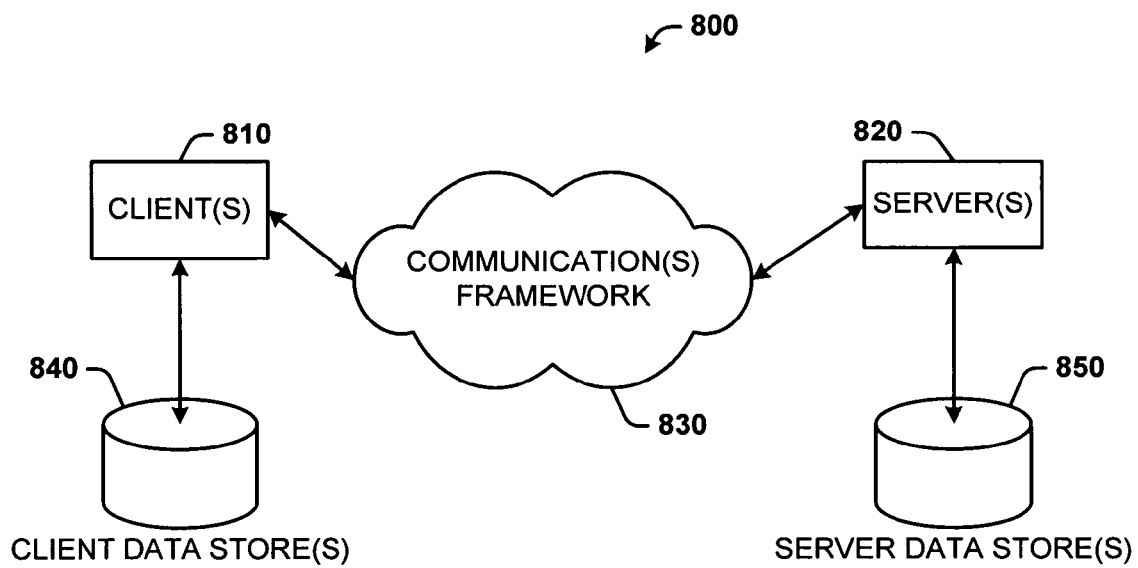
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system allowing for a wireless communication of data across one or more wireless communications links originating and/or terminating at one or more cooperating components on-board a vehicle comprising:
   a PluriBus module to process data packets for the wireless communication across the one or more wireless communications links
   according to a selected wireless communication link multiplexing paradigm, the PluriBus module to:
      perform opportunistic erasure coding on the data packets to generate coded packets,
      estimate a queue length at a bottleneck link of a communications path on the one or more wireless communications links, and
      transmit the coded packets along the communications path when the estimated queue length is zero.

2. The system as recited in claim 1, wherein the PluriBus module is further operable to identify which of the one or more communications links has a minimum delay path.

3. The system as recited in claim 2, wherein the PluriBus module is further operable to transmit the coded packets along the identified one or more communications links having the minimum delay.

4. The system as recited in claim 3, wherein the identified one or more communications links having the minimum delay has a least amount of delay relative to the other one or more wireless communications links.

5. The system as recited in claim 2, wherein the identifying which of the one or more communications links has the minimum delay path includes processing one or more properties of the one or more wireless communications links.

6. The system as recited in claim 5, wherein the properties of the one or more wireless communications links comprises a transmission time required to transmit the data packets across the one or more wireless communications links, a time a data packet spends in a queue of the one or more wireless communications links, and a propagation delay when communicating the data packets across the one or more wireless communications links.

7. The system as recited in claim 1, wherein the opportunistic erasure coding maximizes an expected number of packets recovered with each generated coded packet.

8. The system as recited in claim 1, wherein the opportunistic erasure coding masks losses from applications.

9. The system as recited in claim 1, wherein the opportunistic erasure coding comprises:
   analyzing conditions of the one or more wireless communications links;
   processing a window of the data packets;
   analyzing a past history of the coded packets; and
   updating evolution codes with data obtained from the performing the opportunistic erasure coding.

10. A method implemented on a computing device by a processor to facilitate data communications across one or more wireless communications links comprising:
    receiving data for communication across the one or more wireless communications links;
    encoding the data according to an opportunistic erasure coding paradigm to generate encoded data packets;
    identifying a communications path for the one or more wireless communications links having a least delay path relative to other one or more wireless communications links;
    communicating the encoded data packets across the identified communications path; and
    communicating the encoded data packets across a selected wireless communications link when the selected wireless communications link has an estimated queue length of zero.

11. The method as recited in claim 10, further comprising updating a queue length of the identified communications path.

12. The method as recited in claim 10, wherein the encoding the data according to the opportunistic erasure coding paradigm encodes the data according to one or more partial recovery techniques.

13. The method as recited in claim 10, wherein the identifying the communications path for the one or more wireless communications links includes processing a transmission time for the communications paths.

14. The method as recited in claim 10, wherein the identifying the communications path for the one or more wireless communications links includes determining a time the data spends in a queue of the one or more wireless communications links.

15. The method as recited in claim 10, wherein the identifying the communications path for the one or more wireless communications links includes determining a propagation delay associated with the communicating the data across the identified communications path.

16. The method as recited in claim 10, wherein the communicating the encoded data packets across the identified communications path includes providing two or more wireless communications links proxies to communicate the encoded data packets across the identified communications path.

17. The method as recited in claim 16, wherein the communicating the encoded data packets across the identified communications path includes creating a bridge between the two or more wireless communications proxies to communicate the encoded data packets across the identified communications path.

18. A computer-readable medium stored thereon computer executable instructions to instruct a computing environment to perform a method comprising:

receiving data for communication across the one or more wireless communications links;

encoding the data according to an opportunistic erasure coding paradigm;

calculating a delay path for the one or more wireless communications links;

estimating a queue length of a communications path on the one or more wireless communications links; and communicating the encoded data along the communications path when the estimated queue length is zero.

* * * * *

UNITED STATES PATENT AND TRADEMARK OFFICE
CERTIFICATE OF CORRECTION

| | | |
|---|---|---|
| PATENT NO. | : 7,756,044 B2 | Page 1 of 1 |
| APPLICATION NO. | : 12/183848 | |
| DATED | : July 13, 2010 | |
| INVENTOR(S) | : Jitendra D. Padhye et al. | |

It is certified that error appears in the above-identified patent and that said Letters Patent is hereby corrected as shown below:

In column 16, line 62, in Claim 13, delete "paths." and insert -- path. --, therefor.

In column 18, line 5, in Claim 18, before "one" delete "the".

Signed and Sealed this
Fifteenth Day of March, 2011

David J. Kappos
*Director of the United States Patent and Trademark Office*